United States Patent
Ting et al.

(10) Patent No.: US 10,178,243 B2
(45) Date of Patent: *Jan. 8, 2019

(54) MOBILE ELECTRONIC COMMUNICATIONS WITH GRACE PERIOD

(71) Applicant: TEXTNOW, INC., Waterloo (CA)

(72) Inventors: Derek Ting, Waterloo (CA); Tristan Huntington, Kitchener (CA); Rich Wong, Manhattan Beach, CA (US)

(73) Assignee: TEXTNOW, INC., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,918

(22) Filed: May 5, 2017

(65) Prior Publication Data

US 2017/0244843 A1    Aug. 24, 2017

Related U.S. Application Data

(63) Continuation of application No. 14/747,543, filed on Jun. 23, 2015, now Pat. No. 9,674,375.

(Continued)

(51) Int. Cl.
| | |
|---|---|
| *H04M 15/00* | (2006.01) |
| *H04M 17/00* | (2006.01) |
| *H04W 4/21* | (2018.01) |
| *H04M 17/02* | (2006.01) |
| *G06Q 30/02* | (2012.01) |

(Continued)

(52) U.S. Cl.
CPC ...... *H04M 15/882* (2013.01); *G06Q 30/0267* (2013.01); *H04M 15/56* (2013.01); *H04M 15/8044* (2013.01); *H04M 15/852* (2013.01); *H04M 15/853* (2013.01); *H04M 15/854* (2013.01); *H04M 15/881* (2013.01); *H04M 15/888* (2013.01); *H04M 17/02* (2013.01); *H04M 17/10* (2013.01); *H04M 17/201* (2013.01); *H04W 4/21* (2018.02); *H04M 7/006* (2013.01); *H04W 84/12* (2013.01)

(58) Field of Classification Search
CPC ............ H04M 15/56; H04M 15/8044; H04M 15/853; H04M 15/854; H04M 15/881; H04M 15/882; H04M 17/02; H04M 17/10; H04M 17/201; H04W 4/206; H04W 84/12
USPC ........................................................ 370/338
See application file for complete search history.

(56) References Cited

U.S. PATENT DOCUMENTS

| | | | |
|---|---|---|---|
| 8,897,746 B1 * | 11/2014 | Tarantino | H04M 15/28 455/406 |
| 9,369,592 B1 * | 6/2016 | Velusamy | H04M 17/10 |

(Continued)

*Primary Examiner* — Robert J Lopata
(74) *Attorney, Agent, or Firm* — Perry + Currier Inc.

(57) ABSTRACT

A mobile communications device receives an indication of a balance from a server when establishment of a voice call or sending of a message is requested. The mobile communications device determines whether the balance is sufficient to place the voice call or send the message over a mobile network. If the balance is sufficient to place the voice call or send the message over the mobile network, the voice call is established or the message is sent under normal operating conditions. If the balance is insufficient to place the voice call or send the message over the mobile network, a grace period is activated and the voice call is established or the message is sent during the grace period over an available wireless local-area network.

16 Claims, 8 Drawing Sheets

Related U.S. Application Data (60) Provisional application No. 62/016,829, filed on Jun. 25, 2014.

(51) Int. Cl.
  *H04M 15/02* (2006.01)
  *H04W 84/12* (2009.01)
  *H04M 7/00* (2006.01)

(56) References Cited

U.S. PATENT DOCUMENTS

| | | | |
|---|---|---|---|
| 2002/0029189 A1* | 3/2002 | Titus | G06Q 20/10 |
| | | | 705/39 |
| 2002/0193093 A1* | 12/2002 | Henrikson | H04W 4/24 |
| | | | 455/407 |
| 2003/0233332 A1* | 12/2003 | Keeler | G06Q 20/206 |
| | | | 705/64 |
| 2004/0102182 A1* | 5/2004 | Reith | H04M 15/00 |
| | | | 455/410 |
| 2006/0276170 A1* | 12/2006 | Radhakrishnan | H04L 12/14 |
| | | | 455/405 |
| 2007/0254629 A1* | 11/2007 | Black | H04M 15/00 |
| | | | 455/406 |
| 2009/0075627 A1* | 3/2009 | Hwang | H04M 15/00 |
| | | | 455/408 |
| 2011/0081890 A1* | 4/2011 | Ahmadvand | H04M 15/00 |
| | | | 455/411 |
| 2011/0082779 A1* | 4/2011 | Wong | G06Q 20/28 |
| | | | 705/34 |
| 2013/0045711 A1* | 2/2013 | Gao | H04W 4/24 |
| | | | 455/407 |
| 2013/0310030 A1* | 11/2013 | Ventimiglia | H04W 48/16 |
| | | | 455/434 |
| 2014/0171019 A1* | 6/2014 | Chen | H04M 17/10 |
| | | | 455/406 |
| 2014/0279438 A1* | 9/2014 | Reiff | G06Q 20/28 |
| | | | 705/39 |
| 2015/0381820 A1* | 12/2015 | Ting | H04M 7/0075 |
| | | | 370/259 |
| 2016/0198364 A1* | 7/2016 | Schwarzbauer | H04W 28/08 |
| | | | 370/331 |

* cited by examiner

MOBILE ELECTRONIC COMMUNICATIONS WITH GRACE PERIOD

FIELD

The present invention relates to electronic communications.

BACKGROUND

Prepaid wireless services are known. Such services generally permit a user to buy a refill card or other form of prepaid credit to obtain service for a mobile phone. It is often the case that, when credit is depleted, the mobile phone is cut off from the network, deactivated, or otherwise prohibited from making or receiving further calls or messages.

However, this all-or-nothing approach leaves much to be desired. From the user's perspective, a sudden prohibition on phone calls and messaging can detrimentally affect livelihood and quality of life, given that mobile communication is becoming more or less essential to modern life. From the prepay service provider's perspective, user retention may suffer if users are summarily cut off from service. Other disadvantages of current approaches are also apparent to those skilled in the art.

SUMMARY

According to one aspect of the present invention, a method of communication for a mobile communications device includes receiving user input at the mobile communications device, the user input corresponding to a request to place a voice call or to send a message. The method further includes the mobile communications device receiving an indication of a balance from a server and the mobile communications device determining whether the balance is sufficient to place the voice call or send the message over a mobile network. The method further includes, if the balance is sufficient to place the voice call or send the message over the mobile network, establishing the voice call or sending the message with the mobile communications device under normal operating conditions. The method further includes, if the balance is insufficient to place the voice call or send the message over the mobile network, establishing the voice call or sending the message with the mobile communications device during a grace period over an available wireless local-area network.

According to another aspect of the present invention, a method of controlling voice calls and messages for a mobile communications device configured to communicate over a mobile network includes maintaining an indication of a balance in a balance data record of an account associated with the mobile communications device, the indication of the balance being adjusted to indicate a reduction in the balance in response to at least one of establishment of a voice call over the mobile network or sending of a message over the mobile network. The method further includes determining whether the balance is depleted and tracking a grace period using a grace-period data record while the balance is depleted. The grace period has a predetermined duration that begins from a time that the balance is determined to be depleted. The method further includes disallowing access by the mobile communications device to the mobile network during the grace period and allowing the mobile communications device to establish voice calls or send messages over an available wireless local-area network during the grace period.

According to another aspect of the present invention, a communications system includes at least one server a plurality of mobile communications devices. Each of the plurality of mobile communications devices is associated with an account maintained at the server, and the plurality of mobile communications devices is configured for wireless communications with a mobile network and wireless local-area networks. The server is configured to maintain balances for the accounts and track grace periods for depleted accounts that have balances that are determined to be insufficient to place voice calls or send messages over the mobile network. The server is further configured to allow placing of a voice call or sending of a message for a particular mobile communications device of the plurality of mobile communications devices over an available wireless local-area network of the wireless local-area networks during a respective grace period of a particular account associated with the particular mobile communications device, while disallowing placing of the voice call and sending of the message over the mobile network during the respective grace period.

BRIEF DESCRIPTION OF THE DRAWINGS

The drawings illustrate, by way of example only, embodiments of the present disclosure.

DETAILED DESCRIPTION

The present invention generally relates to providing wireless voice calls and messaging functionality (e.g., messages sent via a short messaging service, SMS, or multimedia messaging service, MMS) for mobile communications devices over a mobile network and wireless local-area networks. Access to voice calls and/or messaging functionality can be based on a prepaid balance. When an account balance associated with a mobile communications device is depleted, voice calls and/or sending of messages are prohibited over the mobile network, while voice calls and/or sending of messages are permitted over a wireless local-area network for the duration of a grace period. The grace period can be set to expire and is reset when a balance top up is made. This can advantageously allow a prepaid user limited access to voice calling and messaging functionality while motivating them to top up their balance. A better end-user experience may be realized, which may result in improved user retention.

The present invention will be described generally in terms of voice calls and additionally or alternatively messaging functionality, such as communication of SMS and MMS messages. Generally speaking, placing voice calls and sending/receiving messages can be referred to as carrier-like activity, which according to the present invention is performed over an Internet protocol-based system. The techniques discussed herein are not limited to voice calls and messaging functionality, and can be applied to other carrier-like activity.

Figure 1:
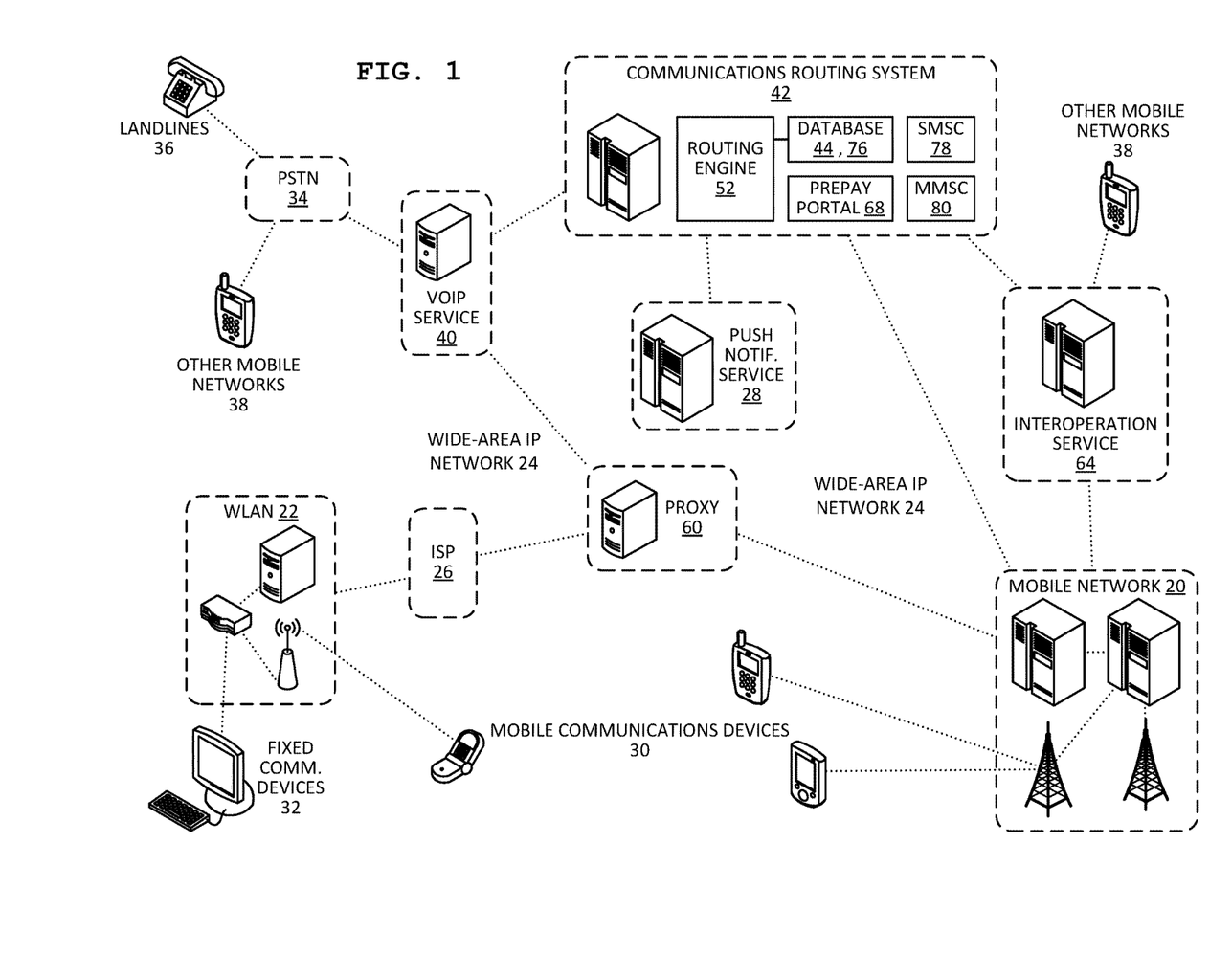
FIG. 1 is a schematic diagram of an overall communications system.

FIG. 1 shows an example of an overall electronic communications system.

The system includes a mobile network 20, such as a wireless cellular network that operates under one or more known standards and technologies, such as Long Term Evolution (LTE), Worldwide Interoperability for Microwave Access (WiMAX), Enhanced Voice-Data Optimized (EVDO), Code Division Multiple Access (CDMA), HSPA (High Speed Packet Access), and similar. The mobile network 20 provides voice, data, and SMS services.

The system further includes at least one wireless local-area network (WLAN) 22 that operates under one or more known standards and technologies, such as IEEE 802.11.

The mobile network 20 and the WLAN 22 each connect to a wide-area IP network 24, such as the Internet. The WLAN 22 can be connected to the wide-area IP network 24 by an Internet service provider (ISP) 26 or the similar entity. The mobile network 20 can be connected to the wide-area IP network 24 by a packet data interface.

The system can further include a push notification service 28, such as the kind operated by Google Inc. of Mountain View, Calif., and Apple Inc. of Cupertino, Calif.

A plurality of mobile communications devices 30 can connect to the mobile network 20, via base stations and other infrastructure, and can further connect to the WLAN 22, via access points or similar. Examples of suitable mobile communications devices 30 include devices such as cellular telephones, smartphones, tablet computers, and the like that are provided with wireless communications interfaces suitable for the particular technologies used in the mobile network 20 and the WLAN 22. For sake of discussion it is assumed that all of the mobile communications devices 30 can connect to the mobile network 20 and WLAN 22. In various implementations, different mobile communications devices have different types of wireless communications interfaces, different configurations, and/or different access rights suitable for connection to different mobile networks and different WLANs.

One or more stationary communications devices 32, such as a desktop computer, server, or similar, can also connect to the WLAN 22, via a router or wired access point.

The system can further be connected to a public switched telephone networks (PSTN) 34 that supports correction to a plurality of landline telephones 36 and additional mobile networks 38. The additional mobile networks 38 may have the same or similar features of the mobile network 20 and may be operated by different carriers and/or operated according to different technologies and standards when compared to the mobile network 20.

The system further includes at least one voice-over-IP (VoIP) service 40, which can be configured to manage IP data streams related to VoIP communications. The VoIP service 40 may operate using one or more protocols, such as the Session Initiation Protocol (SIP), and one or more audio codecs, such as Opus. The VoIP service 40 can be connected to the PSTN 34 to allow VoIP calls to be place to and from landlines 36 and wireless devices in the additional mobile networks 38. In some implementations, the VoIP service 40 is a subcomponent of the mobile network 20.

The system further includes a communications routing system 42 connected to the VoIP service 40, the push notification service 28, and the mobile network 20 via the wide-area IP network 24. In some implementations, the VoIP service 40 is directly connected to the communications routing system 42 via a local IP network distinct from the wide-area IP network 24. In this embodiment, the VoIP service 40 is distinct from the communications routing system 42. The communications routing system 42 is configured to route communications of disparate types between mobile communications devices 30 via the mobile network 20 and the WLAN 22.

The system can further include a proxy 60 connected to the communications routing system 42, the WLAN 22, and the mobile network 20 via the wide-area IP network 24. In some implementations, the communications routing system 42 and the mobile communications devices 30 can be configured to route communications events through the proxy 60. The proxy 60 can be configured to handle VoIP call handoffs, as an alternative to the communications routing system 42 handling such. In addition, the proxy 60 can be configured to prioritize communications events associated with the enhanced 911 system, as an alternative to the communications routing system 42 doing so. For example, the proxy 60 can control quality of service (QoS) settings for various communications, so that 911 calls are prioritized. In some implementations, the VoIP service 40 is configured to route all relevant VoIP data through the proxy 60. A suitable proxy service can be in the form of that available from Pravala Networks Inc., of Kitchener, Ontario, Canada.

The system can further include an interoperation service 64 connecting the communications routing system 42 to the mobile network 20 via the wide-area IP network 24. The communications routing system 42 can be connected to the interoperation service 64 via a virtual private network (VPN) established over the wide-area IP network 24. The interoperation service 64 is configured to interface with the various mobile networks 20, 38. The interoperation service 64 facilitates data communications between the communications routing system 42 and the mobile network 20. The interoperation service 64 further facilitates messaging services, such as SMS and MMS, between the communications routing system 42 and the additional mobile networks 38. The interoperation service 64 can be the kind provided by Syniverse of Tampa, Fla.

The communications routing system 42 includes at least one database, such as an accounts database 44 and one or more user data databases 76, configured to store a plurality of associations between unique account identifiers (e.g., user names) and mobile-network identifiers 46 supported by the mobile network 20, such as mobile directory numbers (MDNs, or telephone numbers). For each user name, the database 44, 76 can store a first MDN for SMS/MMS messages and VoIP calls and a second MDN for services on the mobile network 20. The first and second MDNs are district and mutually different. The first MDN is used at the VoIP service 40 and the communications routing system 42 for VoIP calls. The first MDN is also used at the interoperation service 64 and communications routing system 42 for communicating SMS/MMS messages. In some implementations, the first MDNs are landline telephone numbers obtained from at least one competitive local exchange carrier (CLEC). The second MDN is used by the mobile network 20 to track data usage by each respective mobile communication device 30, with the communications routing system 42 using the second MDNs to map data usage to particular accounts. The database 44, 76 may further store push tokens to identify mobile communications devices 30 via the push notification service 28, so that the communications routing system 42 can send push notifications to the mobile communications devices 30. Alternatively or additionally, the database 44, 76 may store currently assigned IP addresses for the mobile communications devices 30.

In some embodiments, only the first (VoIP) MDN is used and the first MDN is registered with the mobile network 20 for data usage at the mobile network 20. For such embodiments, functionality described herein described with respect to the second (mobile network) MDN is performed using the first (VoIP) MDN.

The communications routing system 42 further includes a routing engine 52 responsive to incoming communications events. Incoming communications events can include initiation of voice calls, ending of voice calls, communication of SMS/MMS messages, requests for data. The routing engine 52 is further configured to route data communications between the plurality of mobile communications devices 30 over the mobile network 20 and the WLAN 22 using the Internet Protocol. The routing engine 52 is further configured to initiate and end voice calls between mobile communications devices 30 as VoIP calls using the VoIP server 40, and to communicate SMS messages between the plurality of mobile communications devices 30 via the mobile network 20 and the WLAN 22 using the Internet Protocol.

The communications routing system 42 can further include a short message service center (SMSC) 78 and a multimedia message service center (MMSC) 80 configured to store, forward, convert and deliver SMS and MMS messages between the communications routing system 42 and the interoperation service 64. The SMSC 78 and MMSC 80 can be configured to communicate with the interoperation service 64 using the Short Message Peer-to-Peer (SMPP) protocol.

Each mobile communications device 30 can be associated with one of the unique account identifiers (e.g., user names) stored in the database 44, 76. This can be achieved by, for example, a client program executed on the mobile communications device 30 requiring a user log in (e.g., client 121 of FIG. 8). When a user is logged in to the client program, the mobile communications device 30 becomes associated with the respective unique account identifier.

Each account identifier can be associated with a second mobile-network identifier, such as a first MDN that is associated with the VoIP service 40. Each account identifier can be associated with a second mobile-network identifier, such as an MDN that is associated with mobile data access on the mobile network 20. In some implementations, the second MDN is only associated with mobile data access on the mobile network 20 to the exclusion of access to circuit-switched voice services and SMS/MMS services that may be available on the mobile network 20. The mobile network 20 uses the second MDN to track data usage of the mobile communications device 30, which can be reported to the communications routing system 42. Hence, for each account, voice services via the VoIP server 40 are conducted with one MDN and data services are conducted via the mobile network using a different MDN. The communications routing system 42 maps each MDN to a particular account for managing overall services to that account.

An outgoing voice call from a mobile communications device 30 is conducted as follows. The mobile communications device 30 sends a call request to the VoIP service 40 via the WLAN 22, if connected, or otherwise via the mobile network 20. The mobile communications device 30 registers with the VoIP service 40 if not already registered. If the destination device is on the PSTN 34, the VoIP service 40 completes the call via the PSTN 34. If the destination device has an account with the communications routing system 42, then the VoIP service 40 notifies the communications routing system 42 of the call request. The communications routing system 42 then issues a push notification to the destination device through the push notification service 28 to notify the destination device of the call. Then the destination device, which is one of the mobile communications devices 30, registers with the VoIP service 40, if not already registered, and notifies the VoIP service 40 of call acceptance. The VoIP service 40 can notify the communications routing system 42 of call initiation and ending. When the proxy 60 is used, VoIP voice data is routed through the proxy 60.

The mobile communications devices 30 can perform SIP registrations in a variety of ways.

For mobile communications devices 30 operating on iOS by Apple Inc., the mobile communication device 30 receiving a push notification does not immediately trigger SIP registration. Rather, the push notification informs the user of the incoming call, via an alert or similar. The user can then respond to the push notification by opening the client program, which then performs the SIP registration.

For mobile communications devices 30 operating on Android by Google Inc., the mobile communication device 30 can be configured to perform a SIP registration in response to receiving a push notification for an incoming call. That is, the SIP registration process can be started before the user has accepted the call.

Incoming calls to the mobile communications devices 30 arrive at the VoIP service 40 via the PSTN 34. The VoIP service 40 notifies the communications routing system 42 of a call request for a particular destination mobile communications device 30. The communications routing system 42 then issues a push notification to the destination mobile communications device 30 through the push notification service 28 to notify the destination mobile communications device 30 of the call. If the user of the destination mobile communications device 30 accepts the call, then the destination mobile communications device 30 registers with the VoIP service 40, if not already registered, and notifies the VoIP service 40 of call acceptance. The VoIP service 40 can notify the communications routing system 42 of call initiation and ending.

Incoming and outgoing calls made to or from a mobile communications device 30 associated with the communications routing system 42 are made using the first MDN, which is established at the VoIP service 40. When such a call is conducted as data via the mobile network 20, the second MDN of the relevant mobile communications device 30 is used to track the data usage on the mobile network 20.

In some embodiments, caller ID is based on the VoIP MDN to the exclusion of the mobile network MDN. That is, the mobile network MDN is for tracking data usage only, and the VoIP MDN is the basis for outgoing and incoming calls.

An outgoing SMS/MMS message can be sent by a mobile communications device 30 as follows. One or more IP data packets containing the SMS/MMS message are sent from the mobile communications device 30 to the communications routing system 42 via the WLAN 22, if connected, or otherwise via the mobile network 20. The sent data specifies a destination device using an MDN. The communications routing system 42 determines whether the MDN is stored in the database 44, 76 and thus whether the destination device is a mobile communications device 30 associated with the communications routing system 42. If the destination device is a mobile communications device 30 associated with the communications routing system 42, then the communications routing system 42 stores the message and sends a push notification to the destination mobile communications device 30 via the push notification service 28. When a user at the destination mobile communications device 30 opens an SMS/MMS application/module or performs a similar action, the destination mobile communications device 30 fetches the stored message from the communications routing system 42. If the destination device is not associated with the communications routing system 42, then the communications routing system 42 sends the SMS/MMS message to the destination device via the interoperation service 64.

Incoming SMS/MMS messages for the mobile communications devices 30 arrive at the communications routing system 42 either directly from other mobile communications devices 30 that have accounts at the communications routing system 42 or via the interoperation service 64 for devices that are not associated with the communications routing system 42. The communications routing system 42 stores a particular SMS/MMS message and sends a push notification to the destination mobile communications device 30 via the push notification service 28. When a user at the destination mobile communications device 30 opens an SMS/MMS application/module or performs a similar action, the destination mobile communications device 30 fetches the stored message from the communications routing system 42.

Incoming and outgoing SMS/MMS messages made to or from a mobile communications device 30 associated with the communications routing system 42 are made using the first MDN. When messages are sent as data through the mobile network 20, the second MDN of the respective mobile communications device 30 is used to track the data usage on the mobile network 20.

Data communications between mobile communications devices 30 and between mobile communications devices 30 and data sources, such as web sites connected to the wide-area IP network 24, are performed via the WLAN 22, if connected, and otherwise via the mobile network 20.

The communications routing system 42 further includes a prepay portal 68 configured to receive top-up payments from users to increase account balance. The prepay portal 68 can be connected to a payment processor (not shown) for verifying payment. The prepay portal 68 may also be configured to process activation of balance increases sold in the form of monthly commitments, top-up cards/codes, online or brick-and-mortar real-time credit purchases (e.g., "ReUps"), or similar. The prepay portal 68 can include one or more of a web-based portal accessible via a web browser and an application-based portal accessible via a module or program installed on the mobile communications devices 30. Top ups can be automatic and periodic, such as automatic monthly payments tied to a user's stored credit card information. For example, the prepay portal 68 can be configured to allow users to activate and deactivate their accounts and enter their payment information. Thereafter, the prepay portal 68 applies a charge at a predetermined rate and frequency, such as monthly.

Voice calls, such as VoIP calls, can be permitted or denied on the basis of a balance associated with an account of a respective mobile communications device 30. A balance indication can be stored at the communications routing system 42, at the mobile communications device 30, or at both. Balance indications can be stored as an amount of talk time remaining, an amount of monetary balance remaining, an amount of data communication remaining, or similar.

Figure 2:
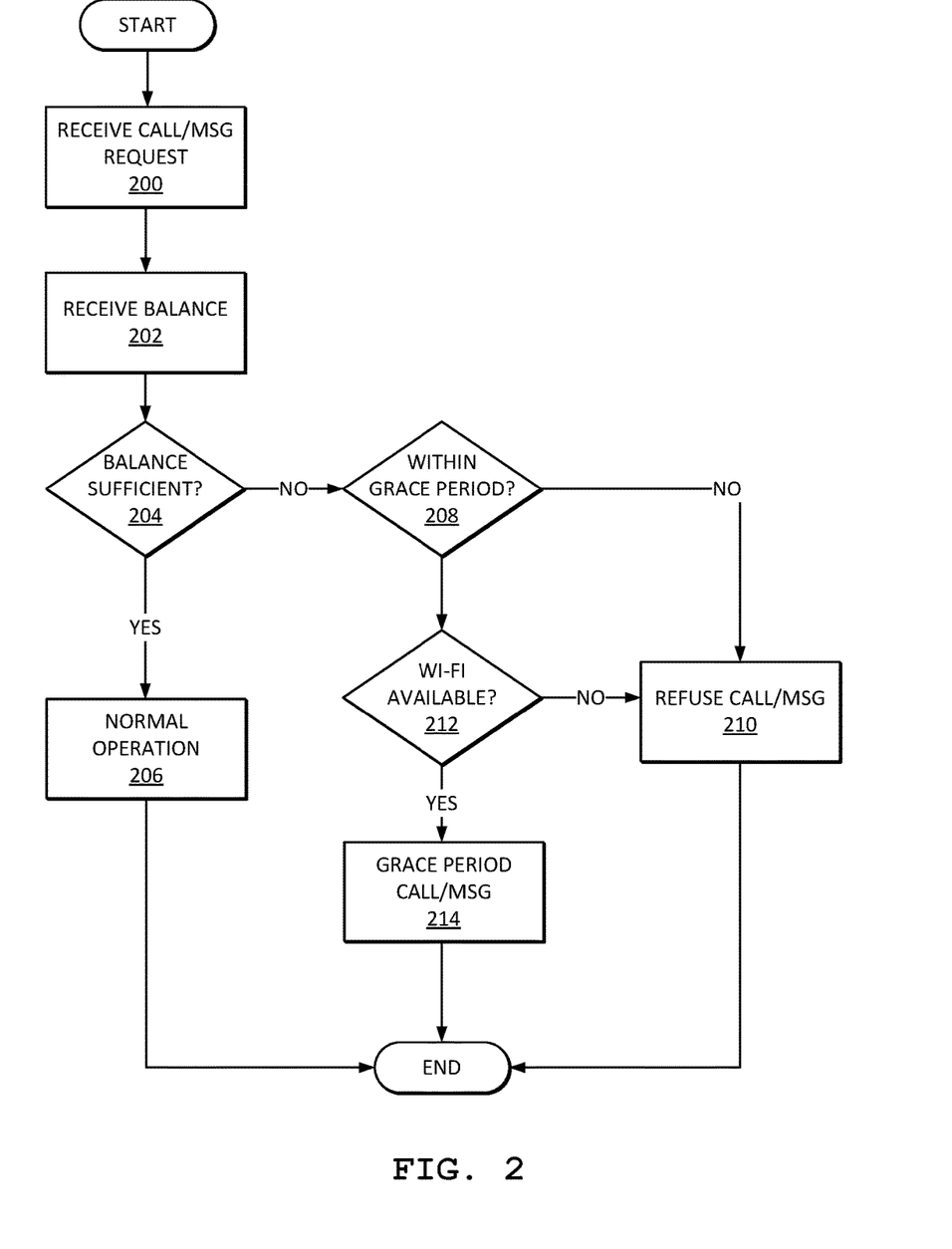
FIG. 2 is a flowchart of a method of operating a mobile communications device in a grace period.

With reference to FIG. 2, a method according to the present invention is shown. The method will be described with respect to the system of FIG. 1, though that system is not limiting. The method is described from the perspective of a mobile communications device 30. However, not all steps need be performed by the mobile communications device 30. In some embodiments, both incoming and outgoing calls are handled according to this method. In other embodiments, only incoming calls or only outgoing calls are handled according to this method.

In this example, at 200, the mobile communications device 30 receives user input corresponding to a request for a voice call. Such user input can be a selection of a contact to call, entry of a phone number and pressing of a "call" button, selection of a telephone number hyperlink, pressing of an "answer" button to accept an incoming call, or similar. In other examples, the mobile communications device 30 receives input of a send message command for an SMS or MMS message, at 200.

At 202, the mobile communications device 30 then receives an indication of a balance from the communications routing system 42. In some embodiments, the mobile communications device 30 requests the balance indication associated with the logged-in account from the routing engine 52. Additionally or alternatively, the mobile communications device 30 can receive periodic indications of the balance from the communications routing system 42, with the mobile communications device 30 storing at least a most-recent indication in non-volatile memory. The balance indication can specify the actual quantity of time, money, data, etc. remaining in the account. Alternatively, the balance indication can simply be a true/false indication that the requested call or message may proceed.

If, at 204, processing of the balance indication determines that the balance is sufficient to proceed with the call over the mobile network 20, then the call is established normally, at 206. The same occurs in the case of a message. That is, the mobile network 20 or the WLAN is selected to conduct the call or send the message under normal operating conditions, which may include determining availability of these pathways and, optionally, referencing other factors, such as user settings, signal strengths, projected call quality, or the like.

If, at 204, processing of the balance indication determines that the balance is insufficient to proceed over the mobile network 20, a grace period is referenced, at 208. Referencing the grace period can include the mobile communications device receiving an indication of the grace period from communications routing system 42, which tracks a grace period for each account. A particular grace period can be active, in that the grace period has already been initiated and has an expiry time in the future. The grace period may be not yet active, in which case the grace period is activated at 208. Finally, the grace period may be expired, which means that the grace period's expiry time is in the past. In embodiments with periodic automatic top ups, the grace-period expiry time can be automatically set to the next top up time, so that the user can enjoy free WLAN calls until their next payment is due.

If the grace period has expired, then the call or message request is refused, at 210.

If the grace period has not yet expired, then the module communications device 30 determines whether it is connected (or can be connected) to a WLAN, such as the WLAN 22, at 212.

If a WLAN connection exists or can be made, then the call is established via the WLAN, at 214. If not, the call is refused, at 210. Similar occurs in the case of an outgoing message.

Figure 3:
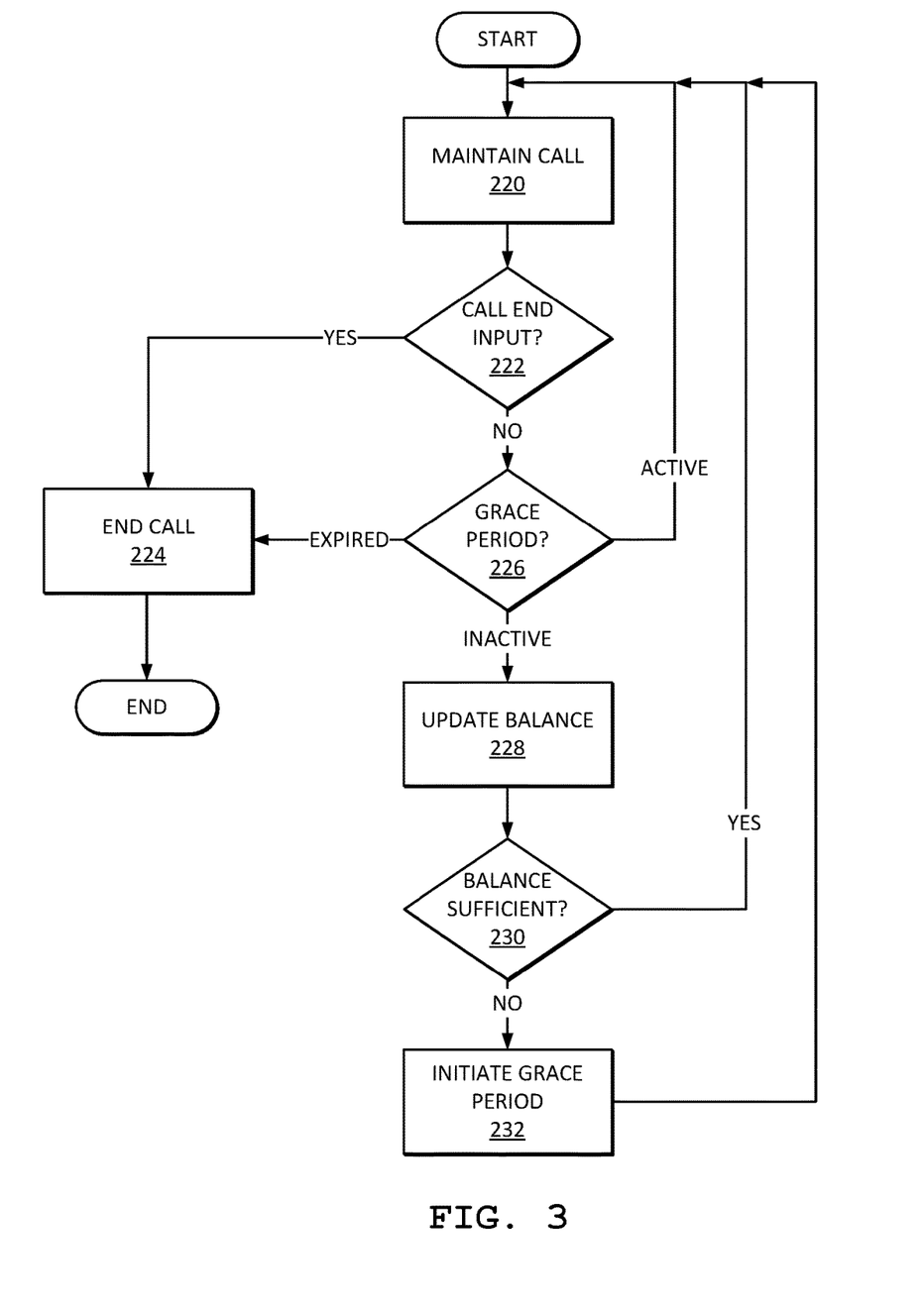
FIG. 3 is a flowchart of a method for initiating a grace period.

FIG. 3 shows a flowchart of a method for initiating the grace period. The method of FIG. 3 will be described as used in conduction with the method of FIG. 2 and the system of FIG. 1, though this is not limiting and the method of FIG. 3 can be used with other methods and systems.

At 220, an existing voice call is maintained at a mobile communications device 30. Such a call can be the result of call initiation at steps 206 or 214 of FIG. 2.

If the call is not ended at 222 and 224 by, for example, one of the parties hanging up or otherwise ending the call, then it is determined whether the grace period is active, at 226. That is, if the grace period has been previously initiated, then the call is maintained, at 220. Step 226 can also include determining whether the grace period has expired, so that a call on the cusp of the grace period can be ended, at 224, on or after expiry of the grace period. The state of the grace period can be tracked at the communications routing system 42, with the mobile communications device 30 being informed, as necessary, by sending of an indication of the grace period from the communications routing system 42 to the mobile communications device 30.

If the grace period is inactive, then the balance of the account associated with the mobile communications device 30 is updated, at 228. Balance updates can be performed by the communications routing system 42 based on information received from the VoIP service 40, such as indications that the call is ongoing. Updating the balance can include decrementing an amount, such as an amount of remaining voice-call minutes, an amount of remaining monetary credit, or an amount of data allocation remaining for the account.

Next, at 230, it is determined whether the balance is sufficient for the call to continue. This determination may be made at the mobile communications device 30 after receiving an indication of the updated balance from the communications routing system 42. Alternatively, this determination may be made at the communications routing system 42 without informing the mobile communications device 30.

If the balance remains sufficient, the call continues to be maintained, at 220.

If the balance has been depleted, then the grace period is initiated, at 232. Initiating the grace period can include storing an indication of the grace period being active and its expiry time in the database 44, 76 of the communications routing system 42. After initiation of the grace period, the call continues to be maintained, at 220.

Figure 4:
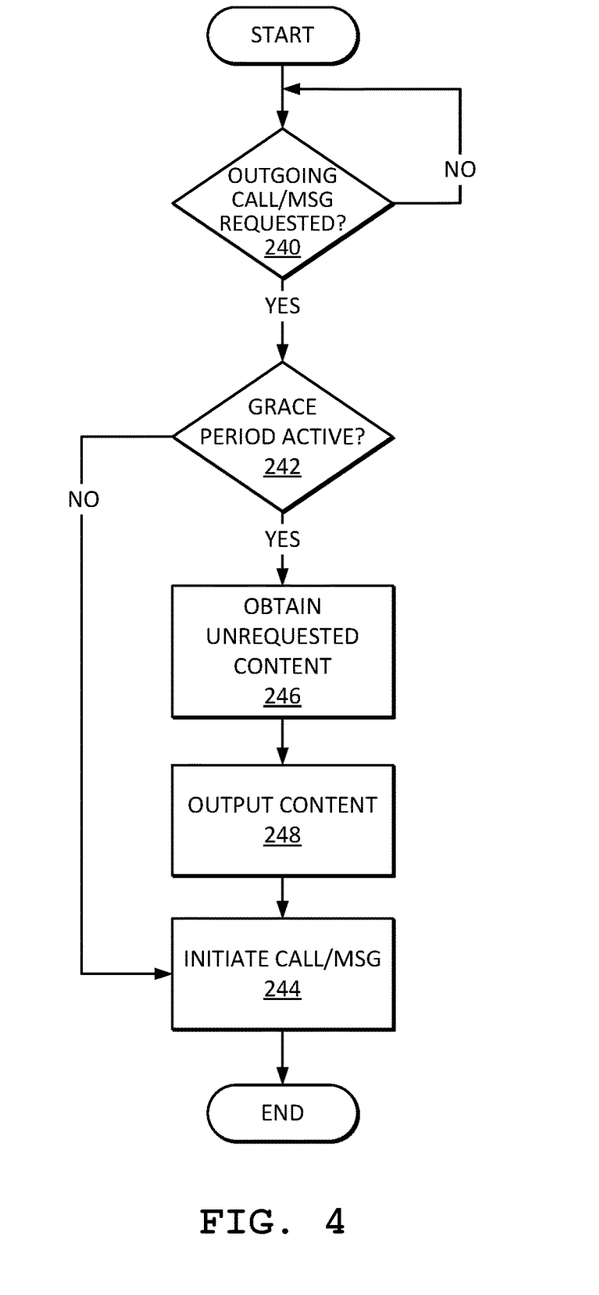
FIG. 4 is a flowchart of a method of delivering specific content during a grace period.

FIG. 4 shows a flowchart of a method for delivering grace period-related content during an active grace period. The method of FIG. 4 will be described as used in conduction with the methods of FIGS. 2 and 3 and the system of FIG. 1, though this is not limiting and the method of FIG. 4 can be used with other methods and systems.

A mobile communications device 30 continually operates, at 240, to respond to user input requesting an outgoing call or message. Such user input can be as previously described with respect to step 200 of FIG. 2.

If an outgoing call or message is requested, then mobile communications device 30 determines whether a grace period is active, at 242. Such determination may be made on the basis of a grace period indication previously sent to the mobile communications device 30 from the communications routing system 42. Alternatively, such determination may be made by the mobile communications device 30 requesting a grace period indication from the communications routing system 42.

If the grace period is not active, then the call is immediacy initiated, at 244, which can includes steps 202-214 as previously discussed with respect to FIG. 2. That is, the voice call can be established based on normal operating conditions, which may include determining an optimal routing for the call, or the voice call can be established as a grace period-call via an available WLAN. In the case of a message, the message is immediately sent, at 244, unless the grace period is active.

If the grace period is active, then the mobile communications device 30 obtains unrequested content, at 246. In one example, an address of such content may be provided to the mobile communications device 30 by the communications routing system 42 in response to the outgoing call or message request. In another example, the address of such content, or the content itself, is pre-stored in memory of the mobile communications device 30, being obtained prior to the call or message request. The address may point to a content source at, or associated with, the communications routing system 42 or may point to another content source available via the wide-area IP network 24 (FIG. 1).

Unrequested content may include video, a still image, audio, other types of content, or a combination of such. Unrequested content in unrequested in the sense that the user of the mobile communications device 30 does not specifically request delivery of the content. Rather, the user requests a voice call or outgoing message and the content is delivered in response to the request and not in response to any specific request for the content. The unrequested content may be wholly formed of or may contain advertisements.

Next, at 248, the unrequested content is output at the mobile communications device 30. The content may be output at a display, speaker, or other output device, depending on the type of content. In some examples, the unrequested content is output immediately and without further user action. In other examples, confirmation is requested from the user, such as by way of a dialog box with text such as "View video to complete your call" and associated confirmation and/or cancellation buttons.

Figure 5:
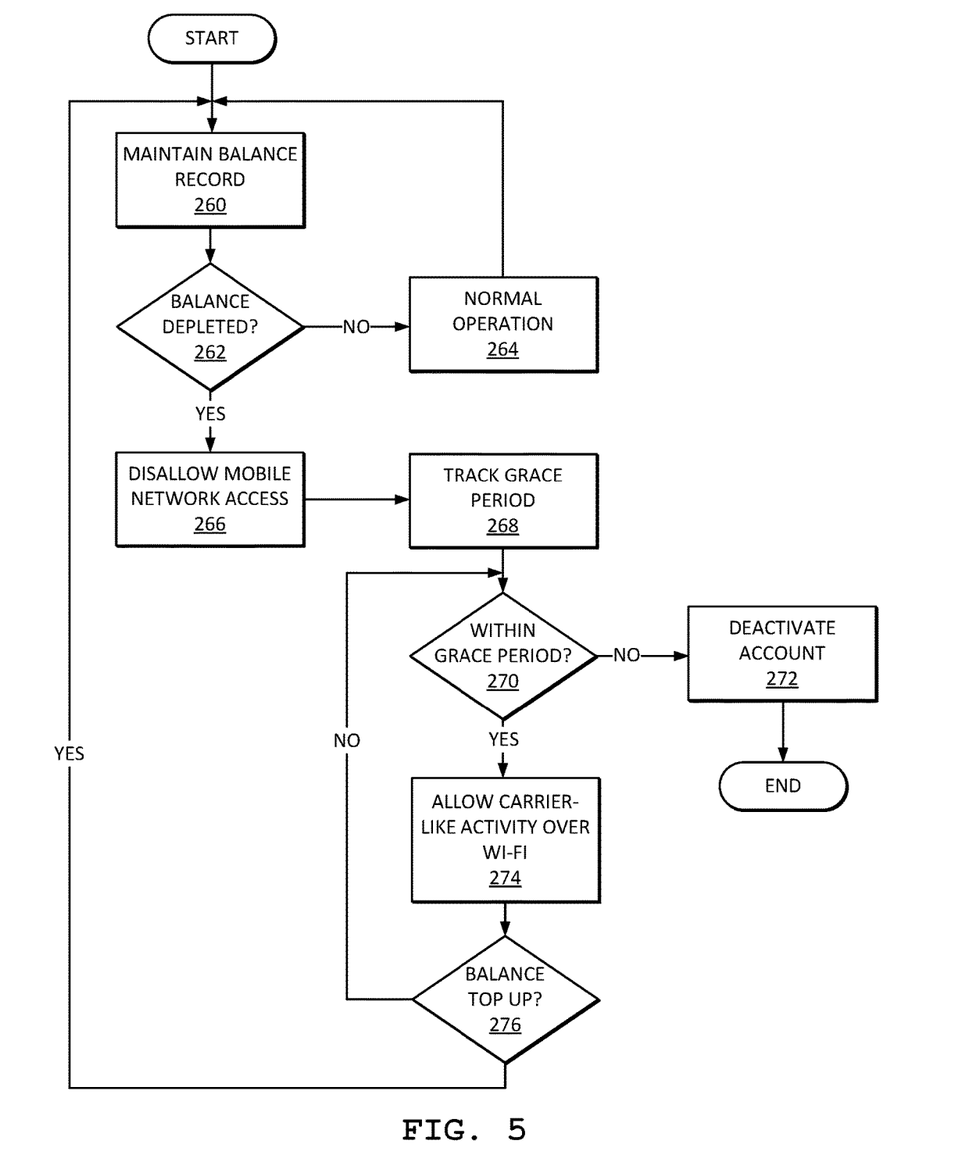
FIG. 5 is a flowchart of a method for controlling a grace period at a server.

FIG. 5 shows a server-side method according to the present invention. The method will be described with respect to the system of FIG. 1, though that system is not limiting. The method is described from the perspective of the communications routing system 42. However, not all steps need be performed by the communications routing system 42, and other entities of the system may perform various steps.

At 260, the communications routing system 42 maintains a balance record for a mobile communications device 30 in, for example, a database 44, 76. Maintaining the balance record can include increasing the balance in response to top-up payments received from a user associated with the respective account and decreasing the balance in response to voice calls and messages. The balance record may store an amount of talk time remaining (e.g., minutes, seconds), an amount of monetary balance remaining (e.g., dollars), an amount of data communication remaining (e.g., megabytes), or similar. In some examples, the balance is adjusted for voice calls established through the mobile network 20 and is not adjusted for voice calls made through the WLAN. In other examples, voice calls over both pathways result in a balance adjustment. The same logic can be applied to messages, whether outgoing or incoming.

At 262, it is determined whether the balance is depleted. The communications routing system 42 can execute a script that periodically obtains the value of the balance record. If the balance is not depleted, then the communications routing system 42 controls calls and messages normally for the mobile communications device 30. Normal operation can include permitting voice call or message routing via the mobile network 20 and the WLAN 20, which may reference factors, such as user settings, signal strengths, projected call quality, or the like.

If the balance is depleted, at 266, the communications routing system 42 can store an indication that disallows voice calls and/or messages via the mobile network 20. Such an indication can take the form of a grace period indicator stored in a database 44, 76. Further, the grace period can be set or reset to have a predetermined duration that begins from the time that the balance is determined to be depleted. The predetermined duration can be stored as an expiry time in the database 44, 76.

Next, at 268, the grace period for the mobile communications device 30 is tracked. This can include comparing a grace period expiry time, which may be stored in the database 44, 76, to a current time.

At 270, it is determined whether the grace period has expired. This can be achieved by determining that the grace period expiry time is in the past. If the grace period has expired, then the communications routing system 42 can deactivate the account, at 272.

Account deactivation, at 272, can include disallowing all wireless communications by the mobile communications device 30, such as access to the mobile network 20 and the WLAN 20. Account deactivation may also include making data records of the account dormant, or archiving and deleting such data records.

If the grace period has not expired, then the communications routing system 42 permits voice calls and messages over available WLANs, such as the WLAN 20 (FIG. 1), at 274. The communications routing system 42 may further permit other carrier-like activities, such as SMS/MMS sending and/or receiving during the grace period.

Lastly, it can be determined whether a balance top up has been made for the account, at 276. If no balance top up has been made, then the method operates within the grace period 270-274. When a balance top up is received, then the method restarts at 260, with the grace period being reset.

Figure 6:
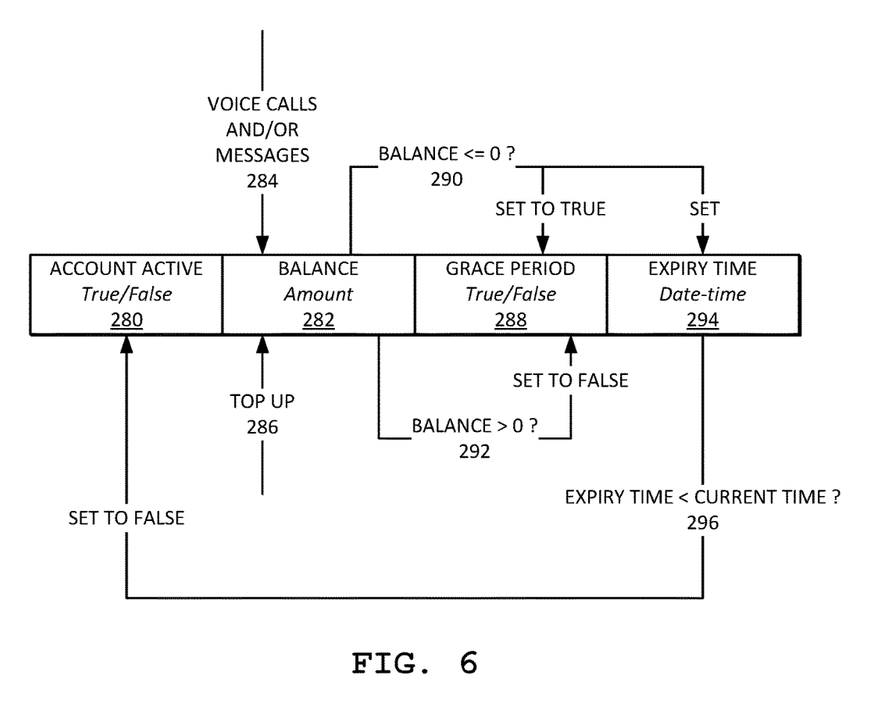
FIG. 6 is a diagram of a data structure for a grace period

FIG. 6 shows a diagram of a data structure supporting a grace period, as well as triggers operating on the data structure. Among other data stored at the databases 44, 76 and/or each mobile communications device 30, as discussed elsewhere herein, data pertaining to the grace periods can also be stored. Grace period data can be stored at one or more of the databases 44, 76, at the mobile communications devices 30, or at a combination of such. For example, the authoritative versions of grace period data may be stored in the database 76, with copies of such data, or indications thereof, needed by the mobile communications devices 30 being transmitted to the mobile communications devices 30 when needed.

The data structure includes an account active/inactive indication 280, which can be represented by a Boolean value. An account may be deactivated when, for example, its balance is depleted at the grace period has expired.

The data structure further includes a balance value 282, which can be represented by a value such as a number (e.g., an amount of money). Voice calls and/or messages 284 and other carrier-like activity decrease the balance value 282, whereas balance top ups 286 are operative to increase the balance value 282.

The data structure further includes a grace period indication 288, which can be represented by a Boolean value. The grace period may be activated (e.g., set to true) in response to the balance value 282 reaching or going below zero, as illustrated by trigger 290. The grace period may be deactivated (e.g., set to false) when the value 282 is topped up to above zero, as illustrated by trigger 292.

The data structure further includes a grace-period expiry time 294, which can be represented by a date-time value (e.g., YYYY-MM-DD HH:MM:SS). The grace-period expiry time 294 can be set in response to the balance value 282 reaching or going below zero, as shown by trigger 290. Periodic comparison of the grace-period expiry time 294 to the current time can be used to trigger 296 setting of the account active/inactive indication 280 to false. That is, when the grace-period expiry time 294 is earlier than the current time, the account is deactivated. In some embodiments, particularly when periodic automatic top ups are implemented, the grace-period expiry time 294 can be automatically set to the time of next top up.

The combination of the grace period indication 288 and the grace-period expiry time 294 allows the grace period to be in various states, such as inactive, active and not yet expired, and expired.

Figure 7:
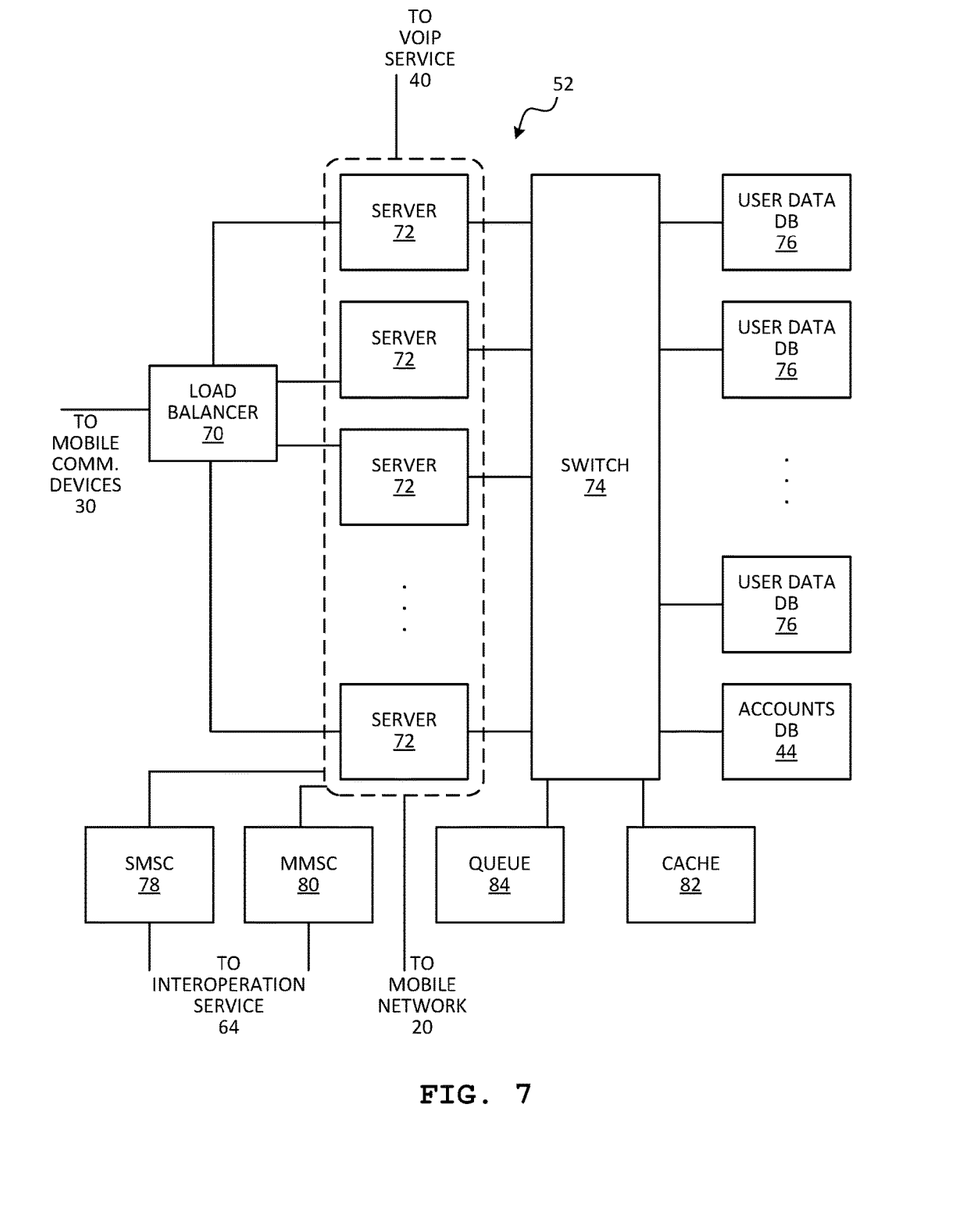
FIG. 7 is a schematic diagram of a communications routing system.

FIG. 7 shows a diagram of the communications routing system 42. The communications routing system 42 includes a load balancer 70, a plurality of servers 72, a switch 74, a plurality of user data databases 76, and the accounts database 44. The load balancer 70, servers 72, and switch 74 can be considered the routing engine 52. However, this is not limiting.

Mobile communications devices 30 connect to the load balancer 70 via the wide-area IP network 24 using a protocol, such as HTTP, HTTPS, or the like. The load balancer 70 is configured to balance requests from the mobile communications devices 30 among the servers 72.

The servers 72 are connected to the load balancer 70. The servers 72 can be configured to interface with the VoIP service 40 and the mobile network 20. The servers 72 can be clones having the same functionality. The servers 72 contain program code configured to interface with application programming interfaces (APIs) provided by the VoIP service 40 and the mobile network 20 and/or provide APIs for use by the VoIP service 40 and the mobile network 20. The servers 72 can be implemented using Nginx, PHP, and similar technology.

The SMSC 78 and the MMSC 80 are connected to the servers 72 and configured to store, forward, convert and deliver SMS and MMS messages between the servers 72 and the interoperation service 64 using, for example, the SMPP protocol and the MM4 protocol. The SMSC 78 and MMSC 80 can be configured to connect to the interoperation service 64 via a suitable binding and through a VPN tunnel. The SMSC 78 and MMSC 80 expose an API to the routing engine 52, such that the routing engine 52 can use the API to send outgoing SMS/MMS messages. For incoming messages, the SMSC 78 and MMSC 80 are configured to invoke an API of the routing engine 52 to cause the routing engine 52 to store a received message and send a notification of the message to the destination mobile communications device 30.

The switch 74 connects the servers 72 to the user data databases 76, the accounts database 44, a cache 82, and a queue 84.

The user data databases 76 store data for each of the users identified in the accounts database 44. Such user data can include the mobile network MDN, session ID, password, residential address, contacts, sessions, in-app purchases, subscriptions, settings, balance information, and communications events including call histories, SMS/MMS message transmission histories, and SMS/MMS message content. The user data databases 76 can be configured to store communications event histories for all user names in the accounts database 44, such that a particular user's history can be downloaded to any communications device 30 with which the user logs in. The user data databases 76 can be implemented as database shards.

The user data databases 76 can further store one or more of an account active/inactive indication 280, an account balance value 282, a grace period active/inactive indication 288, and a grace period expiry time 294 (FIG. 6). The servers 72 can be configured to reference such when determining how to respond to various requests from the respective mobile communications device 30 and the VoIP service 40, such as a request from the VoIP service 40 as to whether a voice call or message should be allowed to be placed or should be allowed to continue. The user data databases 76 can also store credit card information when automatic top ups are implemented, and such information can be stored in encrypted form.

The cache 82 can be checked for data prior to requesting data from the user data databases 76. In addition, requests can be queued in the queue 84, which can be implemented using Redis or similar technology.

The accounts database 44 stores the identity 75 of the user data database 76 that stores the user data associated with each account identifier (user name), and can further store the VoIP MDN for each user.

Figure 8:
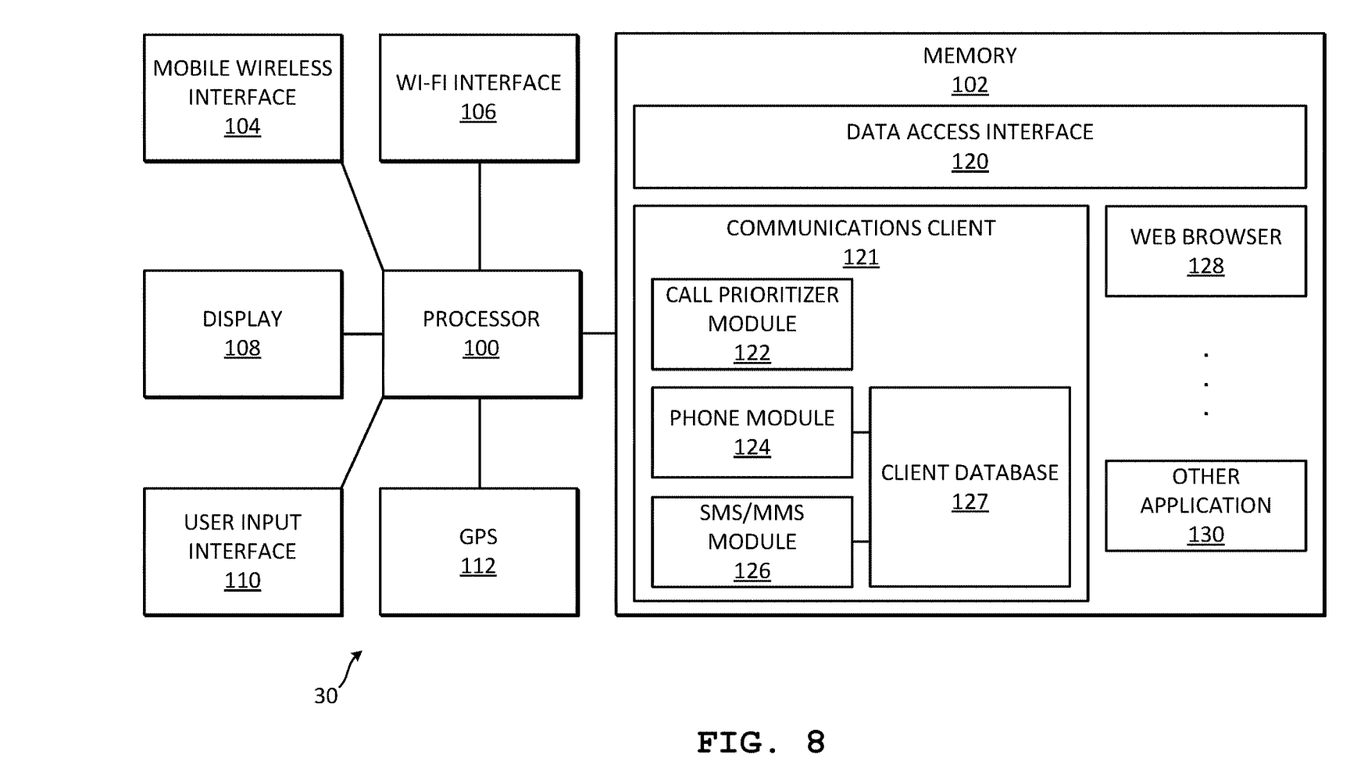
FIG. 8 is a block diagram of a mobile communications device operable with the communications routing system.

FIG. 8 shows a block diagram of a mobile communications device 30.

The mobile communications device 30 includes a processor 100, memory 102, a mobile wireless interface 104, an IEEE 802.11 (Wi-Fi) interface 106, a display 108, a user input interface 110, and a global-positioning system (GPS) chipset 112. The processor 100, memory 102, mobile wireless interface 104, Wi-Fi interface 106, display 108, user input interface 110, and GPS 112 are electrically interconnected and can be physically contained within a small, portable housing. The mobile communications device 30 can include other components, such as a battery, which are omitted from view for clarity. The mobile communications device 30 is an illustrative example of a smartphone or mobile phone suitable for use with the system discussed herein. Other examples should be apparent.

The processor 100 is configured to execute instructions, which may originate from the memory 102, the mobile wireless interface 104, or the Wi-Fi interface 106. The processor 100 may be known a CPU. The processor 100 can include one or more sub-processors or processing cores.

The memory 102 includes a non-transitory computer-readable medium that is configured to store programs and data. The memory 102 can include one or more short-term or long-term storage devices, such as a solid-state memory chip (e.g., DRAM, ROM, non-volatile flash memory), a hard drive, and similar. The memory 102 can include fixed components that are not physically removable from the mobile communications device 30 as well as removable components (e.g., removable memory cards). The memory 102 allows for random access, in that programs and data may be read and written.

The mobile wireless interface 104 can include a chipset, such as an LTE chipset or similar, and one or more antennas suitable for communication with the mobile network 20. Such a chipset may be only be configured for data communications. In some implementations, the mobile communications device 30 advantageously omits any chipset for known circuit-switched communications. The mobile wireless interface 104 may further include a subscriber identity module (SIM) card interface and SIM card, or similar device capable of storing a mobile identifier, such as an MDN.

The Wi-Fi interface 106 includes one or more adaptors and antennas configured to communicate with the WLAN 22. Such adaptors antenna can be compatible with one or more IEEE 802.11 protocols.

In various implementations described herein, selection of the mobile wireless interface 104 or the Wi-Fi interface 106 as the interface through which to conduct a VoIP call or communicate other communication events can be made by the VoIP service 40, the proxy 60, the push notification service 28, or the like.

The display 108 and user input interface 110 can include a touch-screen, speaker, microphone, keypad, and the like, suitable for user input and output of commands, voice, sound, images, video, and similar.

The GPS chipset 112 can include a suitable antenna and support circuitry for collecting GPS satellite signals and calculating position based on same.

A data access interface 120 is a client program stored in the memory 102 and executable by the processor 100. The data access interface 120 is configured to communicate with the communications routing system 42 by specifying an address, such as an IP address, of the communications routing system 42 on the wide-area IP network 24. The data access interface 120 can be configured to require authentication (e.g., via user name and password) with the communications routing system 42 before allowing other applications at the mobile communications device 30 access to the mobile network 20 or WLAN 22. The data access interface 120 is configured to communicate data with the mobile network 20 and the WLAN 22 via the respective interface 104, 106 and provide data services to applications.

A communications client program 121 is stored in the memory 102 and executable by the processor 100. The communications client program 121 can be configured to implement any or all of the client-side functionality discussed herein. The communications client program 121 can include a call prioritizer module 122, a phone module 124, an SMS/MMS module 126, and a client database 127. The communications client program 121 can be implemented using the model-view-controller (MVC) software architectural pattern.

The call prioritizer module 122 provides an interface to applications and modules traditionally associated with circuit-switched applications, such as a phone module 124 and an SMS/MMS module 126. The call prioritizer module 122 can be configured to assign priorities to requests made by other applications and modules. Such priorities can be mapped to QoS settings at the mobile network 20, the WLAN 22, and the proxy 60. For example, a 911 call made through the phone module 124 can be detected as such by the call prioritizer module 122, which is configured to assign maximum priority to such a call and to place such a call through any available network. As the mobile network 20 may only provide data services and/or the device 30 may lack a circuit-switched chipset, the specified priority is passed to the data access interface 120, which passes same to the available network to ensure that the 911 call is given suitable network priority. The data access interface 120 may further be configured to provide GPS and other enhanced 911 information to the network during the emergency call.

In other embodiments, in which a circuit-switched chipset and network (e.g., CDMA) are used, the call prioritizer module 122 is configured to route 911 calls through the circuit-switched network, and to provide GPS and other enhanced 911 information via the circuit-switched network.

The call prioritizer module 122 can also be configured to perform a speed test, using the proxy 60 if appropriate, to determine whether available data throughput rate is sufficient to make a VoIP call. The measured throughput rate can be a condition for allowing a VoIP call or can be used as input to configure an audio codec. In implementations that use a circuit-switched chipset, if a VoIP call is requested and the throughput rate is insufficient, then the call can be routed through the circuit-switched chipset.

The phone module 124 is a client program stored in the memory 102 and executable by the processor 100. The phone module 124 can be configured to support SIP (or other protocol) for call initiation and call ending for VoIP telephony. The phone module 124 can include a VoIP client, such as that available from Acrobits of Prague, Czech Republic. Generally, the phone module 124 can issue call commands and respond to call commands via the interfaces 104, 106, 120. For initiation of VoIP calls, the phone module 124 can be configured to perform a SIP registration with the VoIP service 40. For receiving VoIP calls under Android or similar operating system, the phone module 124 can be configured to respond to push notifications received via the interfaces 104, 106, 120 by initiating a SIP registration, so as to preserve battery life by avoiding unnecessary SIP registrations that may be otherwise needed for keep-alive SIP registration. Alternatively, the phone module 124 can be configured to periodically initiate a SIP registration. For receiving VoIP calls under iOS or similar operating system, the phone module 124 can be configured to initiate a SIP registration when control is passed to the communications client program 121, such as after the user has responded to a push notification alert. The phone module 124 can be configured to present a conventional circuit-switched mobile phone dialing and answering interface to the user. In some implementations, the phone module 124 and the call prioritizer module 122 can be distinct applications.

An SMS/MMS module 126 can be stored in the memory 102 and executable by the processor 100 to provide an interface for inputting, reading, sending, and receiving SMS (and optionally MMS) messages. The SMS/MMS module 126 accesses the mobile network 20 and WLAN 22 via the data access interface 120 and the respective interface 104, 106. The SMS/MMS module 126 can be configured to present a conventional circuit-switched SMS input and output interface to the user.

In some implementations, the phone module 124 and the SMS/MMS module 126 are distinct applications.

The client database 127 stores communications event data locally at the mobile communications device 30. As communications events are composed and sent from communications client program 121, local copies of such communications events can be stored in the client database 127 for reference by the user of the mobile communications device 30. Similarly, as communications events are received at the communications client program 121, local copies of such communications events can be stored in the client database 127 for reference by the user.

The client database 127 can store one or more of an indication of an account balance value 282, a grace period active/inactive indication 288, and a grace period expiry time 294 (FIG. 6). The call prioritizer module 122 and the phone module 124 can be configured to reference such when determining whether and how to place a new voice call. Other applications and modules may also be configured to reference such when determining whether and how to engage in carrier-like actives, such as sending SMS/MMS messages.

A web browser 128 and other applications 130 are client programs stored in the memory 102 and executable by the processor 100. The web browser 128 and other applications 130 are configured to use the data access interface 120 to communicate data with the mobile network 20 and the WLAN 22 via the respective interface 104, 106. Examples of other applications 30 include a chat application, an email application, a social networking client application, a video streaming application, and an Internet radio application. One or more of such applications may also be modules of the communications client program 121.

The techniques discussed above concern a grace period for voice calls and messages, such as SMS and MMS messages. The specific examples discussed are not limiting. In a particular implementation, the techniques can be applied to various carrier-like activities, such as outgoing voice calls, incoming voice calls, outgoing and incoming voice calls, outgoing messages, incoming messages, outgoing and incoming messages, or any combination of such. More than one grace period can be used. For instance, a voice-call grace period can be implemented and separate and distinct a message grace period can be implemented, and these grace periods can have different properties such as different expiry times.

The techniques for implementing a prepaid wireless grace period described above can advantageously allow a user limited access to voice calling and/or messages (or other carrier-like activities) over a WLAN while motivating the user to top up their balance by denying access to a mobile network. A better end-user experience may be realized, which may result in improved user retention.

While the foregoing provides certain non-limiting example embodiments, it should be understood that combinations, subsets, and variations of the foregoing are contemplated. The monopoly sought is defined by the claims.

What is claimed is:

1. A method at a server of controlling voice calls and messages, the method comprising:
   maintaining an indication of a balance in a balance data record of an account associated with a mobile communications device, the indication of the balance being adjusted to indicate a reduction in balance in response to at least one of establishment of a voice call over a mobile network or sending of a message over the mobile network;
   tracking a grace period using a grace-period data record while the balance is depleted, the grace period having a predetermined duration that begins from a time that the balance is determined to be depleted;
   if the balance is sufficient to place the voice call or send the message over the mobile network, allowing the mobile communications device to establish voice calls or send messages over under normal operating conditions; and
   if the balance is insufficient to place the voice call or send the message over the mobile network, during the grace period:
      disallowing access by the mobile communications device to the mobile network; and
      allowing the mobile communications device to establish voice calls or send messages over an available wireless local-area network.

2. The method of claim 1, further comprising expiring the grace period, and disallowing the mobile communications device from establishing voice calls or sending messages over the available wireless local-area network outside of the grace period.

3. The method of claim 1, further comprising sending an indication of the grace period to the mobile communications device.

4. The method of claim 1, further comprising, during the grace period, sending unrequested content to the mobile communications device for output at the mobile communications device.

5. The method of claim 4, wherein the unrequested content comprises advertisements.

6. The method of claim 1, wherein allowing the mobile communications device to establish voice calls over the available wireless local-area network comprises allowing the mobile communications device to establish voice over Internet protocol (VoIP) calls with a VoIP service over the available wireless local-area network.

7. The method of claim 6, comprising tracking the balance data record and the grace-period data record at a server distinct from the VoIP service.

8. The method of claim 1, further comprising receiving a payment for the account associated with the mobile communications device, and, in response to receiving the payment, clearing the grace-period data record.

9. A communications system comprising a server, the server configured to:
maintain an indication of a balance in a balance data record of an account associated with a mobile communications device, the indication of the balance being adjusted to indicate a reduction in balance in response to at least one of establishment of a voice call over a mobile network or sending of a message over the mobile network;
track a grace period using a grace-period data record while the balance is depleted, the grace period having a predetermined duration that begins from a time that the balance is determined to be depleted;
if the balance is sufficient to place the voice call or send the message over the mobile network, allow the mobile communications device to establish voice calls or send messages over under normal operating conditions; and
if the balance is insufficient to place the voice call or send the message over the mobile network, during the grace period:
disallow access by the mobile communications device to the mobile network; and
allow the mobile communications device to establish voice calls or send messages over an available wireless local-area network.

10. The system of claim 9, wherein the server is further configured to expire the grace period, and disallow the mobile communications device from establishing voice calls or sending messages over the available wireless local-area network outside of the grace period.

11. The system of claim 9, wherein the server is further configured to send an indication of the grace period to the mobile communications device.

12. The system of claim 9, wherein the server is further configured to, during the grace period, send unrequested content to the mobile communications device for output at the mobile communications device.

13. The system of claim 12, wherein the unrequested content comprises advertisements.

14. The system of claim 9, wherein the server is further configured to allow the mobile communications device to establish voice over Internet protocol (VoIP) calls with a VoIP service over the available wireless local-area network.

15. The system of claim 14, wherein the server is further configured to track the balance data record and the grace-period data record at a server distinct from the VoIP service.

16. The system of claim 9, wherein the server is further configured to receive a payment for the account associated with the mobile communications device, and, in response to receiving the payment, clear the grace-period data record.

* * * * *